(12) United States Patent
Mars et al.

(10) Patent No.: US 12,200,131 B1
(45) Date of Patent: Jan. 14, 2025

(54) METHODS AND APPARATUS FACILITATING HIGH SECURITY TRANSACTIONS

(71) Applicant: OURARING INC., San Francisco, CA (US)

(72) Inventors: Denis Mars, San Francisco, CA (US); Simon Ratner, San Francisco, CA (US)

(73) Assignee: Ouraring, Inc., San Francisco, CA (US)

(*) Notice: Subject to any disclaimer, the term of this patent is extended or adjusted under 35 U.S.C. 154(b) by 453 days.

(21) Appl. No.: 17/465,747

(22) Filed: Sep. 2, 2021

Related U.S. Application Data

(60) Provisional application No. 63/073,585, filed on Sep. 2, 2020.

(51) Int. Cl.
*H04L 29/06* (2006.01)
*H04L 9/30* (2006.01)
*H04L 9/32* (2006.01)

(52) U.S. Cl.
CPC .............. *H04L 9/3231* (2013.01); *H04L 9/30* (2013.01)

(58) Field of Classification Search
None
See application file for complete search history.

(56) References Cited

U.S. PATENT DOCUMENTS

| | | | | |
|---|---|---|---|---|
| 6,490,443 B1 * | 12/2002 | Freeny, Jr. | ............. | G07B 15/00 455/426.2 |
| 9,197,414 B1 * | 11/2015 | Martin | ............. | H04L 9/12 |
| 9,888,337 B1 * | 2/2018 | Zalewski | ........... | G06Q 30/0635 |
| 9,911,290 B1 * | 3/2018 | Zalewski | ............ | G06Q 20/12 |
| 9,928,379 B1 * | 3/2018 | Hoffer | ............. | G16H 50/20 |
| 10,984,080 B2 * | 4/2021 | Dottax | ............. | H04L 9/3231 |
| 2016/0379220 A1 * | 12/2016 | Tunnell | ............ | H04W 12/068 705/71 |
| 2018/0039990 A1 * | 2/2018 | Lindemann | ............ | G06V 40/19 |

(Continued)

OTHER PUBLICATIONS

Diez, Fidel Paniagua et al. Toward self-authenticable wearable devices. IEEE Wireless Communications, vol. 22, Issue: 1. https://ieeexplore.ieee.org/stamp/stamp.jsp?tp=&arnumber=7054717 (Year: 2015).*

(Continued)

*Primary Examiner* — Jeremiah L Avery
(74) *Attorney, Agent, or Firm* — Holland & Hart LLP

(57) ABSTRACT

A method for a control system includes receiving in a biometric capture portion of a wearable device worn by a wearer, wearer biometric data associated with the wearer, storing in a memory of the wearable device authentic biometric data associated with an authorized user and a private key associated with the wearable device, receiving in a first short-range transceiver of the wearable device payload data, determining in a first processor of the wearable device if the wearer biometric data is authentic in response to the authentic biometric data associated with of the authorized user, encrypting in the first processor the payload data to form encrypted data in response the private key and in response to determining that the wearer biometric data is authentic, and outputting with the first short-range transceiver the encrypted data in response to determining that the wearer biometric data is authentic.

19 Claims, 3 Drawing Sheets

(56) References Cited

U.S. PATENT DOCUMENTS

| | | | |
|---|---|---|---|
| 2018/0041503 A1* | 2/2018 | Lindemann | H04L 63/061 |
| 2018/0191501 A1* | 7/2018 | Lindemann | H04L 9/0833 |
| 2018/0324177 A1* | 11/2018 | Wang | G06F 16/532 |
| 2020/0036708 A1* | 1/2020 | Mars | H04L 63/107 |
| 2020/0036709 A1* | 1/2020 | Mars | H04L 63/0853 |
| 2020/0126058 A1* | 4/2020 | Mars | G06Q 20/40145 |
| 2020/0251936 A1* | 8/2020 | Smith | H02J 50/20 |
| 2020/0394409 A1* | 12/2020 | Cristache | G06V 20/20 |
| 2021/0065489 A1* | 3/2021 | Hass | G07C 9/27 |
| 2023/0401418 A1* | 12/2023 | Cella | H04L 1/1854 |

OTHER PUBLICATIONS

Yi, Shanhe et al. GlassGesture: Exploring head gesture interface of smart glasses. IEEE INFOCOM 2016—The 35th Annual IEEE International Conference on Computer Communications. https://ieeexplore.ieee.org/stamp/stamp.jsp?tp=&arnumber=7524542 (Year: 2016).*

* cited by examiner

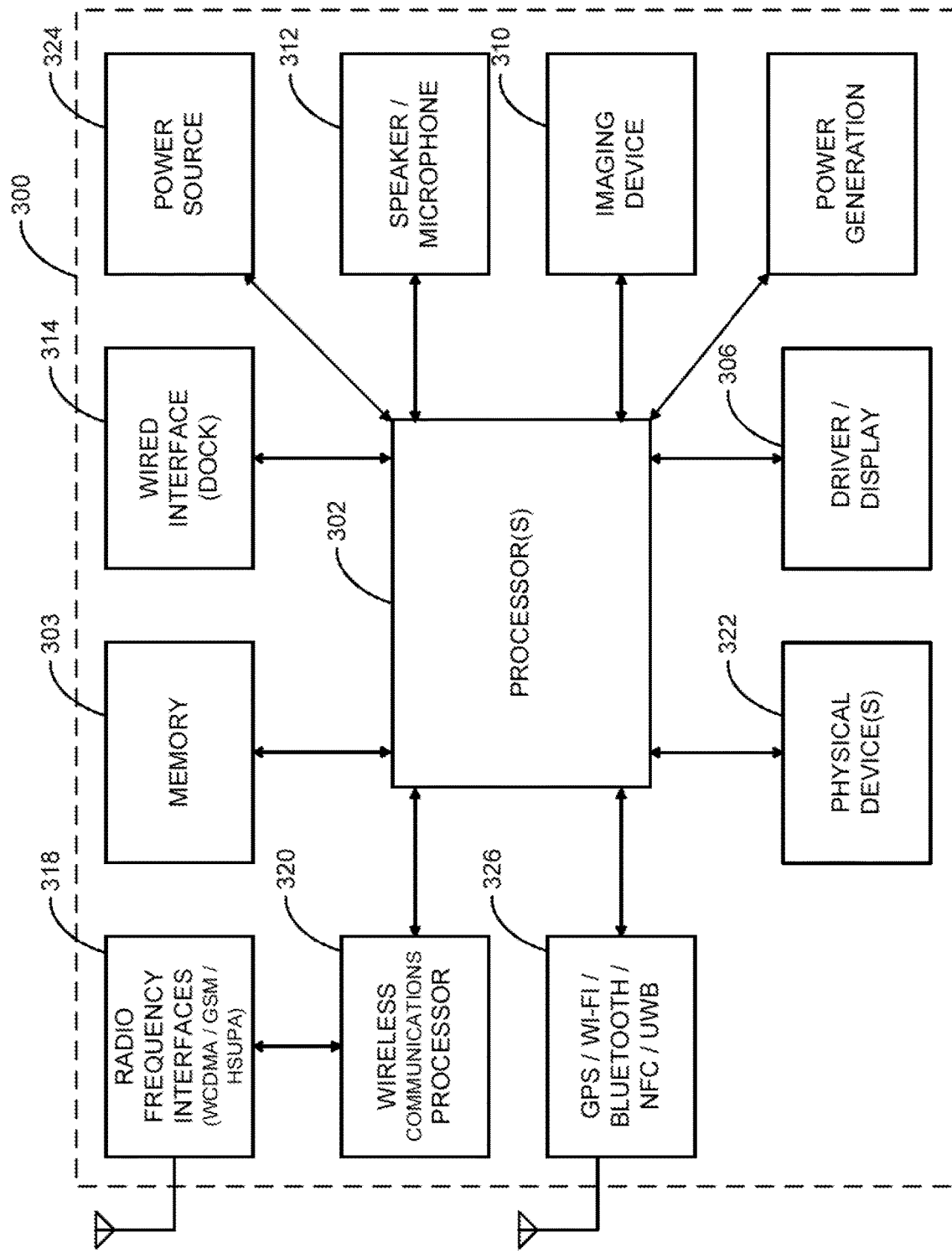

METHODS AND APPARATUS FACILITATING HIGH SECURITY TRANSACTIONS

CROSS-REFERENCE TO RELATED CASES

The present invention claims priority to and is a non-provisional of U.S. App. No. 63/073,585 filed Sep. 2, 2020. That application is incorporated by reference here in for all purposes.

BACKGROUND

The present invention relates to access control systems with high security. More specifically, the invention relates to access control systems with reduced false acceptance rates. Additional embodiments of the present invention relate to high security access control systems using a wearable device.

SUMMARY

The present invention relates to access control systems with high security. More specifically, the invention relates to access control systems with reduced false acceptance rates. Additional embodiments of the present invention relate to high security access control systems using a wearable device.

In various embodiments of the present invention, a user-wearable device may be worn by a user on a finger, a wrist, on the face, on the skin or the like. For example, the user-wearable device may be a ring, a watch, a fitness-type tracker, eyeglasses, earbuds, a skin patch, or the like. The wearable device may include on-demand real-time capture of biometric data the wearer. The biometric data to capture may include: one or more fingerprints, capillary patterns, movement patterns, voice patterns, iris patterns, facial images, heart-beat patterns, otoacoustic emissions (OAE), gesture and movement data and the like. In some embodiments, the wearable device may also determine whether the captured biometric data matches the biometric data of the authorized user (e.g. authenticates the wearer). In some cases, the wearable device may output a special token to a coupled access control device (a control device), using a short-range transceiver if the wearer is authenticated. In some examples, the wearable device may encrypt, hash, or the like, the captured biometric data, and provide that data to a coupled access control device for authentication of the wearer. In other examples, a private key of the wearer may encrypt payload data, and the encrypted data may be provided to the access control device for decryption and authentication. In some cases, the cryptographic key pair (e.g. private key/public key) may be generated using biometric data from the authorized wearer.

In various embodiments, the wearable device includes wireless communication capability for communicating with another device, e.g. a coupled computer system. In some cases, a transceiver may enable short-range wireless communication capability such as: Bluetooth, Bluetooth Low Energy (BLE), Ultra-wideband (UWB), Zigbee, Wi-Fi, IR, NFC, rf, light, or the like. In other embodiments, the transceiver may enable wide-area network communication capability, such as: 4G, 5G, or the like.

In some embodiments, the wearable device may also include a hardware presence token, a hardware private key, or other secure data that is specifically assigned or associated with the user-wearable device. In use, the secure data is used to prove presence of the specific user-wearable device. For example, using the same or different transceiver discussed above, the wearable device may provide a presence token to the coupled access control device, which in turn determines whether the presence token (from the user-wearable device) is authorized or not. In some cases, a single token is provided by the transceiver that includes indication of the biometric match and presence of the specific hardware device. For instance, a data payload may be encrypted using a biometric-based private key and a hardware-based private key and the provided to the computer system. The computer system then uses a biometric-based public key and a hardware-based public key to recover the data payload for comparison purposes.

In other cases, a first short-range communications device, e.g. a Bluetooth transceiver may be used to provide the indication of the biometric match (e.g. encrypted payload), and second short-range communications device, e.g. NFC may be used to provide the presence token of the specific hardware device. As examples of this: biometric match may be provided by NFC, and presence of the device may be provided by optical output (e.g. QR code, bar code, etc.); a biometric match may be an encrypted payload provided by UWB to the access control device, and the hardware presence indicator may also be an encrypted payload provided by NFC to the access control device; and the like.

In various embodiments, the access control system also includes a coupled access control device that communicates with the user-wearable device. The access control device typically includes a central processing unit, a memory, a short-range wireless communication capability (e.g. Bluetooth, Bluetooth Low Energy (BLE), Ultra-wideband (UWB), Zigbee, Wi-Fi, IR, or the like) as well as a near field communication (NFC) reader device. In some embodiments, the access control device may be a smart device, e.g. smart phone, smart tablet, a portable computer (e.g. laptop), a desktop computer, a terminal, or the like. In various embodiments, the access control device may perform operations described herein, according to one or more programs stored in the memory, that include computer code that are executed by the processor.

In some embodiments, under direction of the computer code, generally the access control device may restrict user access to computing assets, unless the user provides the appropriate credentials. The credentials may include the biometric authentication token, the hardware presence token, or the like, from the wearable device. As examples, the access control device may not allow a user to login to the access control device; may not allow a user to access a particular program; may not allow a user to perform a particular function within a particular program; or the like. In some other examples, the access control device may be coupled to a physical access control system, such as a security door, a security gate, an elevator control panel, or the like, and deny the wearer of the wearable device access controlled by physical access control system unless there is a biometric match and a hardware presence.

In some embodiments, the access control device may receive an encrypted, hashed, or encoded version of the user's biometric data, and the access control device may compare it to such processed biometric data of an authorized user. In such cases, if the captured and stored biometric data substantially match (using any conventional methodology, including machine learning (ML)), the access control device may allow user access to the assets (e.g. run a trading program, open a door, or the like). In other embodiments, the access control device may receive a special token from the wearable device. In some examples, data may be digitally signed or encrypted using a public key of the access control device (or security program running thereon), and the access control device may process the special token using a private key to recover the data. If properly signed or the data is appropriately recovered, the access control device may allow user access to the asset (e.g. logging into the access control device, issuing a digital asset (e.g. a digital card for a digital wallet)), or the like.

In some embodiments, the user biometric authentication may occur in real-time or in near real time when the user requests certain actions to be taken. As examples, user authentication may occur when a person attempts to open a smart door; user authentication may occur when a securities trader requests a large trade to be made; user authentication may occur when a user attempts to start a vehicle; or the like. In these examples, the wearable device captures the fingerprint, face print, iris pattern, or the like, and can authenticate or not authenticate the user. This wearer authentication may also be combined with the hardware presence indication discussed above to authorize the action. If authorized, the door may be opened, the trade may be made, the car may start, and the like, and if not authorized, the requested actions will not happen.

In some embodiments, in addition to or alternatively, the access control device may periodically or randomly request the wearable device to re-authenticate the user (and to provide the hardware presence indicator) and may record the responses. For example, in high-reliability applications (e.g. security applications, infrastructure applications, or the like), the access control device may request the wearable device to redetermine the identity of the user currently wearing the device (and in some cases ensure the hardware presence indicator is valid). In some examples, every 30 minutes, the identity of personnel monitoring a nuclear power plant may be verified; pseudo randomly each hour, the identity of air traffic controllers may be verified; or the like. In some embodiments, the wearable device may automatically request and provide the results of the user biometric authentication (e.g. authenticated or not) to the access control device. In such cases, the access control device may be programmed to expect a reauthentication signal from the wearable device sometime every hour, every two hours, every day, or the like. In some embodiments, the wearer may not need to provide their biometric data to the wearable device, if the wearable device senses that it has not been removed from the wearer's body. For example, so long as a capacitive sensor senses that a ring is on a finger, no fingerprint re-swipe, or the like is needed, for the ring to output an authenticated wearer token. In other embodiments, other type of sensors may be used, such as a heartbeat sensor, a temperature sensor, a capillary reading device, or the like.

In some embodiments, without successful user biometric authentication or reauthentication and/or without successful hardware presence, the access control device may shut down access or limit access by the current user. In some examples, the access control device may lock the access control device (e.g. laptop, smart device, smart phone); the access control device may limit the current user choices of an elevator panel to the ground floor; the access control device may limit top speed of a car while still enabling other functions such as steering, braking, etc.; and the like. Additionally, without successful authorization (biometric and hardware presence), the access control device may perform additional functions. As examples, the access control device may activate recording of a computer video camera; the access control device may activate screen recording of a computing device; the access control device may notify security and activate surveillance cameras; the access control device may lock security doors; the access control device may divert the user to a honeypot area; and the like.

In some of the above embodiments, as mentioned above, the authentication of the user may be used in conjunction with the presence of a specific wearable device, before the access control device performs any of the above actions. In some embodiments, the wearable device may include a near field communications (NFC) tag data (or any other short-range communication channel, discussed above) or the like, that includes security data that the access control device reads. In some cases, the NFC tag data may also include dynamic data, such as the current time. In various cases, if the access control device determines that security data from the wearable device is correct (NFC tag data) and the biometric data of the current user is authenticated by the wearable device, the access control device may perform an action. For example, a bank may provide a smart ring to a bank manager that has a specific NFC tag and that is biometrically registered to the bank manager. Then, when the bank manager wants to open a vault, the bank manager may swipe their finger over a sensor location of the smart ring and put it on to initiate the biometric authentication. As disclosed above, in some cases if the smart ring authenticates the biometric signal from the user, the smart ring may provide a signed token to an access control device linked to the vault. Next, the access control device may read the NFC tag to verify the tag was assigned to the bank manager. In some embodiments, if both (token and the NFC tag) are verified or authenticated, the access control device may be authorize opening of the vault, or the like. Such embodiments may be useful to make it more difficult to reverse engineer of hack various embodiments.

In other embodiments, additional factors may be used by the access control device to determine whether to perform specific actions. For example, the user may be required to enter a PIN or passcode into the computer system, the user may be required to send a text message to a specific number, the access control device may have a time lock, or the like.

In some embodiments, the authentication processes described as performed by the access control device may be performed on a remote authentication server (that includes a cloud-based authentication service). For example, the coupled access control device may upload the biometric authentication token and/or the hardware presence token to the remote authentication server for authentication purposes. In such embodiments, the coupled access control device may have a wide-area network connection, e.g. Ethernet, WIFI, 4G, 5G, or the like with the cloud-based authentication service. Such embodiments are beneficial because the access control device need not perform the digital signature verification, decryption of data, or the like. Another benefit is that the coupled computing device need not run the authentication process, such as time-based reauthorization processes, or the like. Accordingly, because such functions may be offloaded to the cloud-based authentication service, the access control device may be controlled by a lower performance processor, a microcontroller, an embedded processor or the like. Combined with reduced memory requirements, the access control device may be cheaper to implement and to operate.

According to one aspect, an access control system is disclosed. One apparatus includes a wearable device configured to be worn by a wearer. One wearable device includes a biometric capture portion configured to capture wearer biometric data associated with the wearer, a memory configured to store authentic biometric data associated with an authorized user and a hardware private key associated with the wearable device, and a first short-range transceiver coupled to the processor, wherein the first short-range transceiver is configured to receive payload data. Another wearable device includes a processor, wherein the processor is configured to determine if wearer biometric data is authentic in response to authentic biometric data associated with of an authorized user, wherein the processor is configured to encrypt payload data to form encrypted data in response a hardware private key and in response to determining that the wearer biometric data is authentic, and a first short-range transceiver configured to output the encrypted data in response to determining that the wearer biometric data is authentic. An system may include a control device. One control device may include a second short-range transceiver configured to output the payload data to the wearable, and wherein the second short-range transceiver is configured to receive the encrypted data from the first short-range transceiver, a memory configured to store a hardware public key associated with the wearable device, and a processor coupled to the second short-range transceiver and the memory, wherein the processor is configured to decrypt the encrypted data to form recovered data in response to the hardware public key, wherein the processor is configured to determine whether the recovered data is authentic in response to the payload data, and wherein the processor is configured to direct performance of a tangible action in response to the processor determining that recovered data is authentic.

According to another aspect, a method for a control system is described. A technique may include receiving in a biometric capture portion of a wearable device worn by a wearer, wearer biometric data associated with the wearer, storing in a memory of the wearable device authentic biometric data associated with an authorized user and a private key associated with the wearable device, and receiving in a first short-range transceiver of the wearable device payload data. A method may include determining in a first processor of the wearable device if the wearer biometric data is authentic in response to the authentic biometric data associated with of the authorized user, encrypting in the first processor the payload data to form encrypted data in response the private key and in response to determining that the wearer biometric data is authentic, and outputting with the first short-range transceiver the encrypted data in response to determining that the wearer biometric data is authentic.

According to yet another aspect, a system is described. One system may include a wearable device configured to be worn by a wearer. A device may include a biometric capture portion configured to capture wearer biometric data associated with the wearer, a first memory configured to store authentic biometric data associated with an authorized user, and a first processor coupled to the biometric capture portion and to the first memory, wherein the processor is configured to determine if the wearer biometric data matches the authentic biometric data of the authorized user. A device may include a first short-range transceiver coupled to the first processor, wherein the first short-range transceiver is configured to output an authorized signal when the processor determines that the wearer biometric data matches the authentic biometric data, and a first near-field communication (NFC) device configured to provide NFC tag data associated with the wearable device. One system may include an access control device coupled to the wearable device. A device may include a second short-range transceiver configured to receive the authorized signal from the first short-range transceiver, a second NFC device configured to receive the NFC tag data from the first NFC device, and a second processor coupled to the second short-range transceiver and to the second NFC device, wherein the processor is configured to operate in response to an executable program. One system may include a second memory coupled to the second processor, wherein the second memory is configured to store the executable program, wherein the executable program comprises executable code that directs the second processor to determine whether the NFC tag data is authorized. In some embodiments, the second processor is configured to direct performance of a tangible action in response to the authorized signal and to the processor determining that the NFC tag data is authorized.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIG. 3 illustrates a block diagram according to various embodiments.

DETAILED DESCRIPTION

Figure 1:
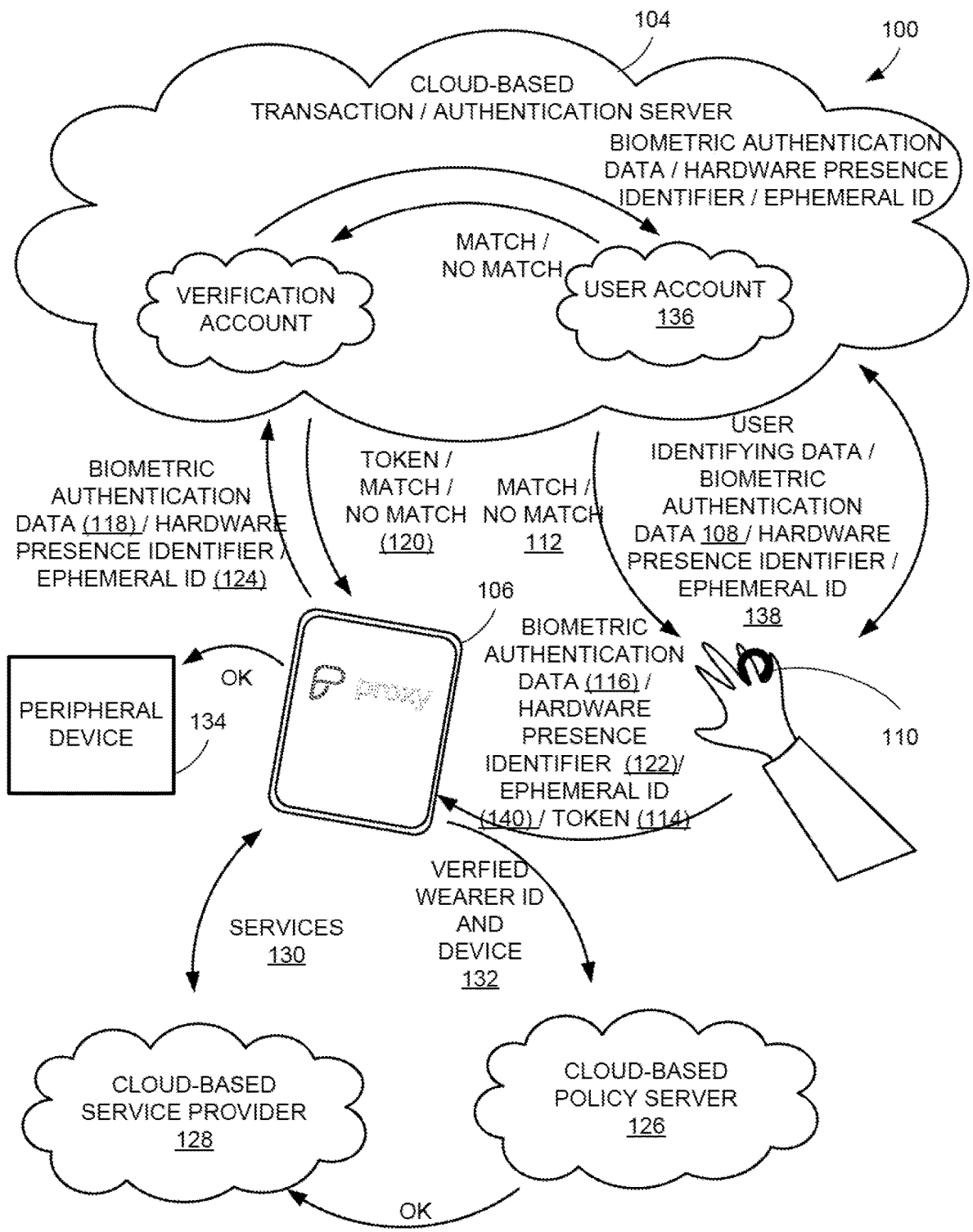
FIG. 1 illustrates a system diagram according to various embodiments.

A process for a system 100 to authorize a physical action according to some embodiments is illustrated in FIG. 1. Some embodiments may include the following steps:

1. A wearable device 110 is provided to the user and is assigned a hardware presence indicator. In some cases, the presence indicator includes data such as a token (e.g. digitally signed data, encrypted data, or the like). The presence indicator may be stored electronically in the wearable device in a secure element, a memory, or the like; may be stored physically on the wearable device in a QR code, bar code, or the like; and the like.

2. It is contemplated that when the wearable device 110 is first provisioned, initialized, or the like for an authorized user, the wearable device 110 may capture one or more samples of biometric data of the authorized user. Based upon these samples, the wearable device 110 may process the biometric data to build a model (using machine learning, a computation, a hash, or the like) of the authorized user's biometric data. The biometric model may be stored in a secure memory (e.g. secure element), and/or encrypted then stored in a more conventional memory, or the like. In other embodiments, the biometric model, hash of the biometric model, a digitally signed biometric model, or the like may be transferred to a local computing device, and/or transferred to a cloud-based authentication service 104, or the like for storage.

In various embodiments, subsequently or at a later time:

3. In some embodiments, the wearer of the wearable device 110 comes in physical contact with the access control device 105. For example, the wearer attempts to interact with an access control device 106 embodied as a control panel; the wearer attempts to use an access control device 106; or the like. In some cases, the access control device 106 may communicate with the wearable device 110 via short-range communication, such as UWB, Bluetooth, BLE, NFC or the like. In various embodiments, the access control device 106 may use the short-range transceiver to determine the presence of the wearable device 110, and in other embodiments to initiate the authorization process described below. In some cases the access control device 106 may initiate contact, and in other cases, the wearable device 110 may initiate contact.

4. In various embodiments, the wearer desires the access control device 106 to perform an action, but is required by the access control device 110 to prove the wearer is authorized before performing the action. As examples, the wearer wants to login into the access control device 106, the wearer wants to perform a financial transaction (e.g. perform a trade) via the access control device 106, the wearer wants to login into a service via the access control device 106, the wearer wants to enter a controlled access 106 area via a control access point (e.g. security door, security gate, etc.), the wearer wants to run a software program upon the computer system 106, the wearer wants to have network access from the access control device 106, or the like.

In response, the access control device 106 may expect the wearable device 110 to return an indication of a biometric match between the wearer of the wearable device 110 and an authorized user of the wearable device (along with a hardware presence indicator, discussed below). In some embodiments, the access control device 106 expects the wearable device 110 to provide an authorization token, authorization data, or the like, as proof of a biometric match.

5. In some embodiments, a user of a wearable device 110 provides incoming wearer biometric data to the wearable device 110. The wearer biometric data may include a fingerprint, a spoken message, an iris scan, a blood vessel scan, movement data, gesture data or the like. In some embodiments, the wearable device 110 may include a sensor that detects whether the wearer of the wearable device wears or removes the device from their person (e.g. finger, wrist, head, earlobe, etc.). For example, a smart ring embodiments may include a fingerprint scanner and a capacitive sensor, and the wearer scans their fingerprint and the capacitive sensor determines that the wearer has put the ring on. In such cases, the scanned fingerprint may be valid biometric data of the wearer, until the capacitive sensor determines that the ring has been taken off.

6. In some embodiments, the wearable device 110 may process the incoming wearer biometric data (e.g. perform a hash, perform a digital signature, or the like) and then compare the incoming wearer biometric data to the authorized user biometric model (hash, or the like). In some cases, a processor of the wearable device 110 may perform the comparison, digital signature analysis, or the like. In other cases, a secure element may receive the incoming wearer biometric data, perform any processing necessary (e.g. hash, digital signature, etc.) and then perform the comparison to the authorized user biometric data. In these cases, the secure element, or the like may return a match or no match result to the processor of the wearable device.

In other embodiments, the authentication process may not occur on the wearable device 110, instead, the matching process may be performed on an access control device coupled to the wearable device (e.g. paired smart phone), in a cloud-based authentication server 104, or the like. In some examples of this, the wearer biometric data may be first processed by in the wearable device 110, e.g. hash, public key encryption, or the like, to protect the wearer's biometric data. Next, the processed wearer's biometric data (e.g. hash) may be transferred via short-range communications, e.g. NFC, WIFI, BLE, or the like, to a coupled access control device 106. In some cases the coupled access control device 106 may store an authorized user's biometric data/model ahead of time and can then compare the processed wearer's biometric data to the processed authorized user's biometric model. If there is a biometric match, the wearer is biometrically authorized.

In still other embodiments, to reduce the computation load on the coupled access control device or wearable device 110, and to enable use of a more powerful algorithms, the access control device or wearable device 110 may upload the processed wearer's biometric data to a cloud-based authentication service 104. In particular, the processed wearer's biometric data may be transferred 108 from the access control device or wearable device to the cloud-based authentication service via wide-area network (e.g. WIFI, Ethernet, 4G, 5G, or the like). In some cases the cloud-based authentication service 104 may store the authorized user's biometric data/model (e.g. hash) ahead of time and can then compare the processed wearer's biometric data to the stored authorized user's biometric model. In such cases, the authentication service 104 may return a match or no match result 112 to the access control device 104 or wearable device 110.

7. In some embodiments, if there is a biometric match determined in the wearable device 110, the wearable device may provide a digitally signed token 114, or the like as output for the coupled access control device. In some examples, a message, such as a unique hardware identifier of the wearable device or a hashed version of the hardware ID, a current time stamp, or the like may be encrypted with a private key associated with the wearable device 104. It is contemplated that the access control device 106 or the cloud-based authentication service 104 knows the public key associated with the wearable device. This token may be provided 114 to the access control device 106 by short-range method, such as UWB, BLE, NFC, and the like, as mentioned above.

8. Upon receipt of the token, the access control device 106 (or the cloud-based authentication service) may use the known public key of the wearer device to decrypt the token and return the message. If successful, the message can be compared to a variety of parameters. For example, if the message includes a time stamp, the access control device may determine whether the time stamp is fresh or recent, e.g. within the last few minutes. In another example, if the message includes a hardware identifier, the access control device may determine if the hardware identifier (or hashed hardware identifier) is in a list of authorized hardware identifiers, or the like.

In some cases, the authentication processes may not occur on the wearable device 110, instead, the matching process may be performed on an access control device 104 coupled to the wearable device, in a cloud-based authentication server 104, or the like. In some examples of this, the wearer biometric data may be first processed by in the wearable device 110, e.g. hash, public key encryption, or the like, to protect the wearer's biometric data. Next, the processed wearer's biometric data may be transferred 116 via short-range transceiver to a coupled access control device 106. In some cases the coupled access control device 106 may store an authorized user's biometric data/model, biometric public key, or the like and then compare the processed wearer's biometric data to the processed authorized user's biometric model, or determine whether the wearer's biometric data falls within the authorized user's biometric model.

In some cases, the access control device 106 may upload the processed wearer's biometric data 116 to a cloud-based authentication service 104 for processing. These embodiments reduce the computation requirement capability of the coupled access control device 106, and to enables the access control device 106 use of a less powerful, lower cost processor (e.g. embedded system, microcontroller, etc.). In particular, the processed wearer's biometric data may be transferred 118 from the coupled access control device 106 to the cloud-based authentication service 104 via wide-area network (e.g. WIFI, Ethernet, 4G, 5G, or the like. In some cases the cloud-based authentication service 104 may store the authorized user's biometric data/model and then compare the processed wearer's biometric data to the stored authorized user's biometric model. In such cases, the service may return 120 a biometric match or no biometric match result to the access control device.

9. In addition to matching the wearer's biometric data to the authorized user's biometric model, in various embodiments, the wearable device 110 must also provide a hardware identifier 122 to the access control device 106 (and in some cases the cloud-based authentication server). In some embodiments, the hardware identifier may be tangible, such as an optical code (e.g. QR code, bar code, laser-engraved pattern, pattern displayed on a display of the wearable device, or the like). In these cases, the computer system may use an optical scanner (e.g. camera, laser scanner, or the like) to acquire the optical code data. The computer system may then verify if the optical code data is authorized to access the computer system. If the optical code data is authorized and there is a biometric match, the computer system may be accessed by the wearer.

In other embodiments, the hardware identifier may be intangible and be provided electronically. For example, the hardware presence identifier may be based upon a physically unclonable function (PUF) upon a hardware element. In some cases the PUF is used to generate a public private key pair, where the public key is provided ahead of time to the computer system and/or to the cloud-based authentication server 104. In some embodiments, if there is a biometric match, the wearable device 110 may encrypt a biometric match message using the PUF based private key. The computing device 104 (or cloud-based authentication server) may then decrypt the encrypted message using the PUF public key to recover the biometric match message. In some cases, the message payload may include a time stamp, an identifier associated with the user (e.g. real name, employee ID, account information, a nonce, or the like).

In other cases, the hardware presence identifier need not be PUF based, and the public/private key pair may be assigned during provisioning. For example, when first assigned to a specific user, the public/private key pair may be computed based upon data such as the user's name, user ID, a hardware serial number, or the like. Once computed, the wearable device 110 may store the private key in a secure memory, while the public key is registered with the cloud-based authentication server 104. As the wearable device 110 is provisioned to be access or to perform actions on a specific computing device (e.g. use and trade on a specific computer), the public key for the wearable device 110 is downloaded from the cloud-based authentication server 104 to the specific computing device 106.

In still other embodiments, hardware identifiers may be provided by any numerous methods, such as via NFC, via other rf channels (UWB, ZigBee, Wi-Fi, etc.) via vibrations, via infrared or other optical method, and the like.

In some embodiments discussed herein, the wearable device 110 may identify itself to the access control device via an ephemeral identifier (ID) that is not-permanently associated with the wearable device (e.g. changes every hour, 8 hours, 1 day, 3 days, etc.). The cloud-based authentication service 104 may maintain an association between the ephemeral IDs and the data (e.g. biometric hash, hardware hash, public keys (e.g. biometric public key, hardware public key, or the like), or the like associated with the authorized wearer the wearable device/the wearable device 110. During peer to peer communications, the wearable device 110 uses the ephemeral ID to identify itself to access control devices 106. The access control devices 106 then provide 124 the ephemeral IDs to the cloud-based authentication service 104 to perform the authentication process. These data or public keys may be used by the authentication service 104 to perform the authentication process, and to notify the access control device 106 whether the wearable device is authorized or not. In such embodiments, as ephemeral IDs associated with wearable devices 110 change, the access control device 106 or multiple access control devices will not be able to track wearable devices over any appreciable time period.

10. In various embodiments, after the access control device/cloud-based authorization 104 server verifies that wearer of the wearable device has proven the biometric match and has provided the hardware presence identifier, the access control device 106 may provide access to the user/wearer to assets controlled by the access control device 106, as specified by specific policies. More specifically, in some embodiments, the authorization may be provided 132 to a cloud-based policy server 126, based upon identification of the wearer and the wearable device 110, that controls access to specific services or assets. In turn, the policy server may communicate with a cloud-based service provider 128 to authorize the services 130 to the wearable device upon the access control device.

In some examples, the wearer may operate a peripheral device 134 such as a vehicle, a keypad, a control, etc.; the wearer may be provided access to specific locations via a security door, a security gate, a turnstile, etc.; the wearer may be provided with a tangible good such as a key-card, key, equipment, etc.; or the like.

In other examples, the wearer may be provided access to services, such as being able to run specific programs on or on a device controlled by the access control device; to obtain computing services such as internet access, access to protected directories, access to software services (e.g. paid), etc.; to perform financial transactions (e.g. stock transfers, money transfers between accounts, purchase goods or services from specific accounts); and the like.

In some embodiments, wearer biometric authentication as well as hardware presence identifiers may be initially required by the computer system 106. In additional embodiments, the biometric and hardware authentication may also be required, on-demand, when the wearer is attempting to perform specific actions. In some examples, each time a wearer attempts to perform stock trades, re-authentication is required; each time a wearer attempts to open a file or access a new directory, re-authentication is required; and the like. In various embodiments, the reauthentication may not be readily apparent to the wearer, for example, for a smart ring embodiment, capillary and blood vessel patterns may be scanned without wearer intervention; for smart watch embodiment, heartbeat patterns may be acquired without wearer intervention; and the like. Periodic re-authentication enables relatively seamless access of the wearer to the good or service.

11. In other embodiments, as discussed above, the access control device 106 may also monitor the wearer use of the wearable device 110. In some cases, the access control device 106 may periodically request the wearable device 110 to reauthenticate the wearer. For example, every hour, the wearer may have to reenter their biometric data and/or provide the hardware presence indicator.

In some examples, if a smart ring, smart watch, smart glass, or the like determines that the wearer has not taken off the wearable device, the wearable device may provide the results of the last wearer biometric data match without the wearer having to reenter their biometric data.

In some embodiments, if the wearer is not reauthenticated, full access to the assets (e.g. peripheral device or services) may be terminated. For example, access to specific software program/services may be stopped or may be limited (e.g. limiting further use, reducing functionality or services, or the like). In other examples, access to certain physical secure areas may be limited (e.g. security doors will not open), security personnel may be notified of the presence of the not reauthenticated wearer, and the like. In still other examples, a device may have limited functionality, for example a vehicle may enforce a speed limit, an elevator control panel will only provide access to a specified floor (e.g. lobby, security services floor, etc.), and the like.

In other embodiments, access to the peripheral devices 134 or services may not be terminated, but the wearer access may be monitored/recorded by the access control device for evidentiary purposes. In other embodiments, wearer access to specific services may be directed to a honeypot-type region, or the like.

Figure 2:
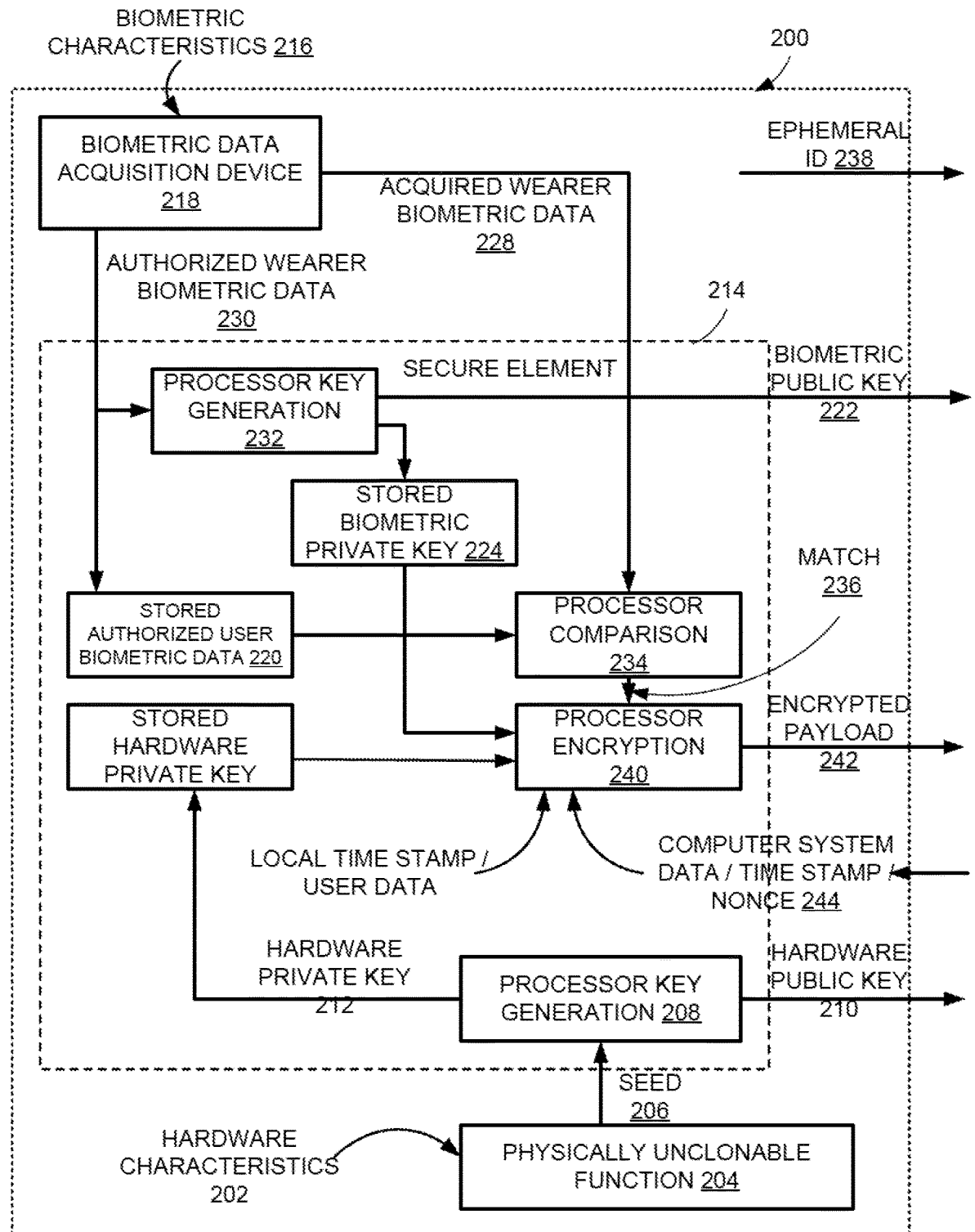
FIG. 2 illustrates another system diagram according to various embodiments.

A more detailed process for a wearable device 200 to provide authorization data is illustrated in FIG. 2. Some embodiments may include initial provisioning of the wearable:

1. In various embodiments, the hardware of the wearable device has one or more electrical components that have characteristic hardware performance 202, such as inherent resistance, inherent capacitance, memory performance, and the like that can be measured. These values are typically different from wearable device to wearable device based upon fabrication differences during semiconductor manufacturing, battery fabrication, assembly and the like.

2. In light of these differences in hardware performance, in some embodiments, one or more physical unclonable functions (PUF) 204 are implemented to determine a seed number, pseudo random number, random number, or the like. Any number of algorithms may be used to determine the seed 206 based upon hardware performance, e.g. leakage current, capacitance, signal latency, and the like.

3. In various embodiments, the PUF output (e.g. seed) may be used by a processor 208 to determine a cryptographic key pair (e.g. hardware public key 210, hardware private key 212). Any number of algorithms may be used to determine the hardware key pair, based upon the PUF output. In other embodiments, symmetric and other types of cryptographic keys may be used.

4. During initial provisioning of the wearable device, the hardware public key 210 may be output to the cloud-based authentication server, via a smart device (e.g. smart phone) paired to the wearable device (e.g. smart ring) or directly by the wearable device (e.g. smart watch) itself, as discussed above in FIG. 1. In response, the cloud-based authentication server 104 may create an account 136 for the (authorized) user, if one does not already exist, and store and associate the hardware public key with the user account.

Subsequently, in some embodiments, if an access control device 106 is provisioned to allow access by the authorized user, the hardware public key of the authorized user may be downloaded into the access control device 106. In other embodiments, the access control device 106 does not receive the hardware public key and relies upon the cloud-based authentication server 104 to determine if the hardware of the wearable device is authentic.

5. In some embodiments, the hardware private key 212 may be stored in a secure element (that includes a secure memory, or the like) 214 within the wearable device. It is contemplated that the hardware public/private key determination may be performed in the factory, before the wearable device is provided to an end user. Advantages to this includes that the wearable device may be coupled via direct electrical connections to the authorization server, or the like. In some cases, the authorization server may directly provide the seed for the hardware public/private key generation, accordingly a direct electrical connection provides secure transfer of the seed. After the wearable device determines the hardware keys, it may also directly transfer the hardware public key back to the authorization server, providing additional security. Additionally, in various embodiments, the wearable device may store the hardware private key in a secure element. This is advantageous as the wearable device does not have to re-compute the cryptographic keys in real-time (costing energy and delay), when the hardware private key 212 is needed to encrypt payload data. By having the hardware private key (and biometric private key) pre-computed and stored in the secure element, the wearer and hardware authentication process described herein is greatly facilitated.

6. During initial provisioning of the wearable device, the authorized user may provide their biometric data 216 via a biometric acquisition device 218. As mentioned above, this may take the form of a fingerprint, blood vessel pattern, audio input, heartbeat patterns, gestures, or the like. In some embodiments, multiple biometric captures are used to create an authorized user biometric model.

7. The authorized biometric data or model may also be stored in the secure element 220 (that includes a secure memory, or the like) or in other memory of the wearable device.

8. In some embodiments, the authorized biometric data or model 230 may also be used by a key generator 232 to generate an authorized wearer biometric data public 222/private key 224 pair, or other type of cryptographic data.

9. The biometric private key may also be stored in the secure element 214 (that includes the secure memory, or the like) or other memory of the wearable device.

10. During initial provisioning of the wearable device, in some embodiments, the biometric public key 222 may be output to the cloud-based authentication server 104, via a smart device (e.g. smart phone) paired to the wearable device (e.g. smart ring) or directly by the wearable device (e.g. smart watch) itself. In response, the cloud-based authentication server 104 may create an account for the (authorized) user, if one does not already exist, and store and associate the biometric public key 222 with the authorized user account.

Subsequently, in some embodiments, if an access control device is provisioned to allow access by the authorized user, the biometric public key of the authorized user may be downloaded into the access control device. In other embodiments, the access control device does not receive the biometric public key and relies upon the cloud-based authentication server to determine if the hardware of the wearable of the device is authorized.

Subsequently, in various embodiments, the following steps may be taken (referring to FIGS. 1 and 2):

1. In some embodiments, the wearable device 110 provides identifying information to the cloud-based authentication server 104 along with an ephemeral ID (non-permanent) 138/238.

2. The access control device 106 advertises its presence to the wearable device 110 (e.g. BLE advertisement signals, or the like).

3. The wearable device 110 provides the ephemeral ID 140 signal to the access control device 106.

4. A wearer of the wearable device 110 may enter their biometric data 216 to the wearable device 200. As discussed above, this may be a deliberate action, (e.g. swiping their fingertip across a sensor, making a gesture, etc.), or a passive action, e.g. wearing the device and having the device sense biometric data (e.g. heartbeat pattern, a blood vessel pattern, or the like).

5. In these embodiments, the wearer biometric data 228 may be provided to a secure element 214 of the wearable device where storage and processing of sensitive data, e.g. authorized user biometric model, biometric private key, hardware private key, and the like is stored.

6. In some embodiments, the incoming user biometric data may be compared by a process 234 to the authorized wearer biometric data model. Conventional techniques, such as vector matching may be used in some examples to determine a quality of match. If the quality exceeds a threshold, e.g. 80%, 90%, or the like, a match is confirmed.

7. As illustrated in FIG. 2, if the biometric match 236 is confirmed, payload data may be provided, such as the authorized wearer name, account number, wearable device stamp, hardware serial number, or the like. In some embodiments, payload data may be provided 244 by the computer system that is requesting the authentication.

In such cases, the computer system may provide data such as a computer system time stamp, a serial number, a nonce, or the like. By providing this data to the wearable device reduces the chance that a duplicate or clone wearable device may have pre-programmed outputs, regardless of whether the wearer biometric data is actually captured and authenticated.

8. In the illustrated embodiments, if the biometric match is confirmed, the payload data may be encrypted by a process 240 using the biometric private key and the hardware private key. This encrypted data 242 is then output to the access control device and/or the authentication service.

In other embodiments, biometric public/private keys are not needed, and the payload data may be encrypted using the hardware private key. More specifically, the secure element processor, or the like will proceed to encrypt the payload data when there is a biometric match. Accordingly in such embodiments, no biometric data or biometric derived data (e.g. biometric public key, hash of biometric, or the like) leaves the control of the secure element. In other words, the wearable device is primarily responsible for storing biometric data, and verifying or not verifying that the wearer is an authorized user. Additionally, the only cryptographic key output by the wearable device may be the hardware public key, discussed above.

In some examples, upon provisioning the specific wearable device the cloud-based authentication server maintains the hardware public key associated with the specific wearable device. In some embodiments, when a policy server, or the like determines that an authorized wearable of a specific wearable device should be able to control an access control device, the cloud-based authentication server may provide the hardware public key to the access control device. In other embodiments, the hardware public key may be maintained on the authentication server. Accordingly, when a policy server, or the like determines that an authorized wearer of a specific wearable device should be able to control an access control device, the cloud-based authentication server may be configured so that the access control device will contact the authentication service to decrypted and verify the encrypted payload data using the hardware public key. Upon successful verification of the payload data, the access control device may receive a token or other message from the cloud-based authentication server.

In other embodiments, no hardware private key is used, and the hardware serial number may be provided as part of the payload data. Subsequently, the hardware serial number is compared to a list of wearable devices stored in the cloud-based authentication server and provisioned for access in the computer system.

In still other embodiments, the hardware serial number may be provided to the access control device via NFC tag, via optical code (e.g. QR code, etc.).

9. As discussed above, the access control device 106 may decrypt the encrypted data using the public biometric key and public hardware key to recover the payload, and then determine if the payload is authentic. In some examples, the payload may be an identifier of the computer system, a nonce provided by the computer system, or the like.

In other embodiments, the access control device does not store the public biometric key or hardware public key. Instead, the encrypted data, the payload data, and the ephemeral ID are provided from the access control device to the cloud-based authentication server. In turn, the authentication server determines the hardware public key and/or biometric public key using the ephemeral ID, and decrypts the encrypted message. If recovered payload data matches the provided payload data, the authentication service may provide a token (encrypted with a private key of the authentication server) or other authorization message back to the access control device. If the access control device verifies the validity of the token (e.g. decrypts with a public key of the authentication server), the access control device may authorize the action or service to the wearer of the wearable device.

FIG. 3 illustrates a functional block diagram of various embodiments of the present invention. More specifically, it is contemplated that from user smart devices to cloud-based servers may be implemented with a subset or superset of the below illustrated components. In FIG. 3, a computing device 300 typically includes an applications processor 302, memory 304, a display 306, an image acquisition device 310, audio input/output devices 312, and the like. Additional communications from and to computing device 300 can be provided by via a wired interface 314 (e.g. dock, plug, controller interface to peripheral devices); a GPS/Wi-Fi/Bluetooth interface/UWB 316; RF interfaces 318 and driver 320, and the like. Also included in some embodiments are physical sensors 322 (e.g. (MEMS-based) accelerometers, gyros, magnetometers, pressure sensors, temperature sensors, bioimaging sensors etc.).

In various embodiments, computing device 300 may be a hand-held computing device (e.g. Apple iPad, Microsoft Surface, Samsung Galaxy Note, an Android Tablet); a smart phone (e.g. Apple iPhone, Google Pixel, Samsung Galaxy S); a portable computer (e.g. netbook, laptop, convertible), a media player (e.g. Apple iPod); a reading device (e.g. Amazon Kindle); a fitness tracker (e.g. Fitbit, Apple Watch, Garmin or the like); a headset or glasses (e.g. Oculus Rift, HTC Vive, Sony PlaystationVR, Magic Leap, Microsoft HoloLens); a wearable device (e.g. Motiv smart ring, smart headphones); an implanted device (e.g. smart device medical) or the like. Typically, computing device 300 may include one or more processors 302. Such processors 302 may also be termed application processors, and may include a processor core, a video/graphics core, and other cores. Processors 302 may include processor from Apple (A12, A13), NVidia (Tegra), Intel (Core), Qualcomm (Snapdragon), Samsung (Exynos), ARM (Cortex), MIPS technology. In some embodiments, processing accelerators may also be included, e.g. an AI accelerator, Google (Tensor processing unit), a GPU, or the like. It is contemplated that other existing and/or later-developed processors may be used in various embodiments of the present invention.

In various embodiments, memory 304 may include different types of memory (including memory controllers), such as flash memory (e.g. NOR, NAND), SRAM, DDR SDRAM, or the like. Memory 304 may be fixed within computing device 300 and may include removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), security applications, application data, operating system data, databases or the like. Additionally, in some embodiments, a secure device including secure memory and/or a secure processor are provided. The secure device It is contemplated that other existing and/or later-developed memory and memory technology may be used in various embodiments of the present invention.

In various embodiments, display 306 may be based upon a variety of later-developed or current display technology, including LED or OLED status lights; touch screen technology (e.g. resistive displays, capacitive displays, optical sensor displays, electromagnetic resonance, or the like); and the like. Additionally, display 306 may include single touch or multiple-touch sensing capability. Any later-developed or conventional output display technology may be used for the output display, such as LED IPS, OLED, Plasma, electronic ink (e.g. electrophoretic, electrowetting, interferometric modulating), or the like. In various embodiments, the resolution of such displays and the resolution of such touch sensors may be set based upon engineering or non-engineering factors (e.g. sales, marketing). In some embodiments, display 306 may integrated into computing device 300 or may be separate.

In some embodiments of the present invention, acquisition device 310 may include one or more sensors, drivers, lenses and the like. The sensors may be visible light, infrared, and/or UV sensitive sensors that are based upon any later-developed or convention sensor technology, such as CMOS, CCD, or the like. In some embodiments of the present invention, image recognition algorithms, image processing algorithms or other software programs for operation upon processor 302, to process the image data. For example, such software may pair with enabled hardware to provide functionality such as: facial recognition (e.g. Face ID, head tracking, camera parameter control, or the like); fingerprint capture/analysis; blood vessel capture/analysis; iris scanning capture/analysis; otoacoustic emission (OAE) profiling and matching; and the like. In various embodiments of the present invention, imaging device 310 may provide user input data in the form of a selfie, biometric data, or the like.

In various embodiments, audio input/output 312 may include conventional microphone(s)/speakers. In various embodiments, voice processing and/or recognition software may be provided to applications processor 302 to enable the user to operate computing device 300 by stating voice commands. In various embodiments of the present invention, audio input 312 may provide user input data in the form of a spoken word or phrase, or the like, as described above. In some embodiments, audio input/output 312 may be integrated into computing device 300 or may be separate.

In various embodiments, wired interface 314 may be used to provide data or instruction transfers between computing device 300 and an external source, such as a computer, a remote server, a storage network, another computing device 300, a client device, a peripheral device to control, or the like. Embodiments may include any later-developed or conventional physical interface/protocol, such as: USB, micro USB, mini USB, USB-C, Firewire, Apple Lightning connector, Ethernet, POTS, custom dock, or the like. In some embodiments, wired interface 314 may also provide electrical power, or the like to power source 324, or the like. In other embodiments interface 314 may utilize close physical contact of device 300 to a dock for transfer of data, magnetic power, heat energy, light energy, laser energy or the like. Additionally, software that enables communications over such networks is typically provided.

In various embodiments, a wireless interface 316 may also be provided to provide wireless data transfers between computing device 300 and external sources, such as computers, storage networks, headphones, microphones, cameras, or the like. As illustrated in FIG. 3, wireless protocols may include Wi-Fi (e.g. IEEE 802.11 a/b/g/n, WiMAX), Bluetooth, Bluetooth Low Energy (BLE) IR, near field communication (NFC), ZigBee, Ultra-Wide Band (UWB), Wi-Fi, mesh communications, and the like. As described above, data transmissions between computing device 300 and identity reader 1104 may occur via UWB, Bluetooth, ZigBee, Wi-Fi, a mesh network, or the like.

GPS receiving capability may also be included in various embodiments of the present invention. As illustrated in FIG. 3, GPS functionality is included as part of wireless interface 316 merely for sake of convenience, although in implementation, such functionality may be performed by circuitry that is distinct from the Wi-Fi circuitry, the Bluetooth circuitry, and the like. In various embodiments of the present invention, GPS receiving hardware may provide user input data in the form of current GPS coordinates, or the like, as described above.

Additional wireless communications may be provided via RF interfaces 318 and drivers 320 in various embodiments. In various embodiments, RF interfaces 318 may support any future-developed or conventional radio frequency communications protocol, such as CDMA-based protocols (e.g. WCDMA), GSM-based protocols, HSUPA-based protocols, G4, G5, or the like. In the embodiments illustrated, driver 320 is illustrated as being distinct from applications processor 302 and wireless interface 316. However, in some embodiments, various functionality are provided upon a single IC package, for example the Marvel PXA330 processor, and the like. It is contemplated that some embodiments of computing device 300 need not include the wide area RF functionality provided by RF interface 318 and driver 320.

In various embodiments, any number of future developed, current operating systems, or custom operating systems may be supported, such as iPhone OS (e.g. iOS), Google Android, Linux, Windows, MacOS, or the like. In various embodiments of the present invention, the operating system may be a multi-threaded multi-tasking operating system. Accordingly, inputs and/or outputs from and to display 306 and inputs/or outputs to physical sensors 322 may be processed in parallel processing threads. In other embodiments, such events or outputs may be processed serially, or the like. Inputs and outputs from other functional blocks may also be processed in parallel or serially, in other embodiments of the present invention, such as acquisition device 310 and physical sensors 322.

In some embodiments of the present invention, physical sensors 322 (e.g. MEMS-based) accelerometers, gyros, magnetometers, pressure sensors, temperature sensors, imaging sensors (e.g. blood oxygen, heartbeat, blood vessel, iris data, etc.), thermometer, otoacoustic emission (OAE) testing hardware, and the like may be provided. The data from such sensors may be used to capture data associated with device 300, and a user of device 300. Such data may include physical motion data, pressure data, orientation data, or the like. Data captured by sensors 322 may be processed by software running upon processor 302 to determine characteristics of the user, e.g. gait, gesture performance data, or the like. In some embodiments, sensors 322 may also include physical output data, e.g. vibrations, pressures, and the like.

In some embodiments, a power supply 324 may be implemented with a battery (e.g. LiPo), ultracapacitor, or the like, that provides operating electrical power to device 300. In various embodiments, any number of power generation techniques may be utilized to supplement or even replace power supply 324, such as solar power, liquid metal power generation, thermoelectric engines, rf harvesting (e.g. NFC) or the like.

In some embodiments, PUF hardware components may also be provided, e.g. capacitive devices, resistive devices, memory devices, or the like.

FIG. 3 is representative of an access control 300, a wearable device or an authentication server capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 3. For example, a smart phone (e.g. access control device) configured to perform may of the functions described above includes most if not all of the illustrated functionality. As another example, a wearable device, e.g. a smart ring (electronic devices enclosed in a ring-shaped shell, enclosure, or form factor), may include some of the functional blocks in FIG. 3, but it need not include a high-resolution display 330 or a touch screen, a speaker/microphone 360, wired interfaces 370, or the like. In still other examples, a cloud-based server or a virtual machine (VM) may not include image acquisition device 312, MEMs devices 322, GPS capability 316, and the like, further components described above may be distributed among multiple computers, virtual machines, or the like.

It is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

Further embodiments can be envisioned to one of ordinary skill in the art after reading this disclosure. For example, in some embodiments, a wearable device may be a ring, a smart watch, a fitness tracker, smart glasses, smart earbuds or earphones, a patch worn on the skin, and the like. Additionally, the computing device interacting with the wearable device may be a smart tablet, a smart phone, a computer, a control access system, and the like. Further, the cloud-based authentication server may provide service for one organization or multiple organizations and may be implemented as virtual machines, and the like. Additionally, different methods for providing or combining biometric match and hardware presence indicators are contemplated. In light of the current patent disclosure, one of ordinary skill in the art will recognize other criteria that can be incorporated into alternative embodiments of the present invention.

In the various embodiments above, to maintain privacy of the wearable device with respect to the access control device, the following techniques may be incorporated. More specifically, to maintain privacy, the wearable device may identify itself with an ephemeral identifier (ID). This ephemeral identifier is non-permanent and temporary, and is unique to the wearable device for a relatively short amount of time, e.g. 1 hour, 8 hours, 1 day, or the like. In some embodiments, for example, a BLE MAC address associated with the wearable device may be used, although other identifiers may also be used. In various embodiments, the cloud-based authentication service may be used to resolve the ephemeral ID to a specific wearable device, and the access control system may not be able to resolve the ephemeral ID without assistance from the cloud-based authentication service.

In operation, the wearable device will periodically (or on demand) communicate with the cloud-based authentication service (facilitated by a paired smart device or directly via wide-area network) and provide the current ephemeral ID and a unique hardware identifier, both currently associated with the wearer and wearable device, and the cloud-based authentication server will maintain that association.

Next, when the wearable device approaches an access control device, the access control device advertises its presence. In some embodiments, in response, the wearable device provides its current ephemeral ID to the access control device, and the access control device may provide some payload data to the wearable device, (via short-range transceiver) in any order. In some examples, the access control device then contacts the cloud-based authentication server and provides the ephemeral ID (e.g. via wide-area network). In response, the authentication server uses the ephemeral ID to determine the specific wearable device currently associated with the ephemeral ID and the associated biometric public key and/or hardware public key, and may return the public key(s) back to the access control device (e.g. via wide-area network). The access control device receives the encrypted data (as discussed above, payload data encrypted with a hardware private key and/or a biometric private key) from the wearable device (via short-range transceiver) and then uses the public key(s) to recover data encrypted data. As discussed above, if the data matches the payload data the access control device previously provided, the wearable device is deemed to be authenticated. The access control device then authorizes the desired access, e.g. directs a peripheral device to perform an action, (e.g. opening of a door), allows directly or in directly (e.g. with use of a policy server), the wearer of the wearable device to use computer resources, to allow a user to perform a stock trade, or the like.

The above embodiments are believed to be very useful for access control systems as they will not store or maintain data that can trace or track wearers or wearable devices. More specifically, throughout the day, it is contemplated that multiple wearable devices will be within the range of the access control device, and the access control devices may attempt to authenticate these wearable devices. Digital traces of each attempt may be stored in one form or another within the access control device, such as communications identity, serial number, hardware ID, or the like of the wearable device; the hardware public keys used to authenticate the wearable devices, and the like. As it is contemplated that the usage of the above techniques will be widespread, such digital traces for each access control device may be used to track wearable devices throughout the day or other time period. Accordingly, hackers, state-actors, or other non-state actors may be motivated to hack access control devices to gain information on specific users, users' accounts, and user transactions. These attacks are detrimental to the access control devices as they may be damaged due to repeated attacks, for example, they may have corrupted or misconfigured data and software, they may have spyware installed, they may be attacked with denial of service attacks, and the like. In the above embodiments, since the access control devices do not necessarily maintain the identity of the authenticated wearers of the wearable devices (but only ephemeral identifiers), it greatly reduces the value of identity data of wearable devices that are stored on these devices. Accordingly, it is believed that access control devices will be subject to fewer harmful and malicious attacks.

In other embodiments, combinations or sub-combinations of the above disclosed invention can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

We claim:

1. An access control system, comprising:
    a wearable device configured to be worn by a wearer, wherein the wearable device comprises:
        a biometric capture portion configured to capture wearer biometric data associated with the wearer;
        a memory configured to store the wearer biometric data, authentic biometric data that has been authenticated as being associated with an authorized user, and a hardware private key associated with the wearable device; and
        a first short-range transceiver coupled to a processor, wherein the first short-range transceiver is configured to receive payload data;
        the processor coupled to the biometric capture portion, to the memory and to the first short-range transceiver, wherein the processor is configured to:
            determine that the wearer is the authorized user based at least in part on comparing the wearer biometric data to the authentic biometric data associated with the authorized user, and
            encrypt, in response to determining that the wearer is the authorized user, the payload data to form encrypted data using the hardware private key and a biometric-based private key that is generated based on the wearer biometric data of the authorized user;
            wherein the first short-range transceiver is also configured to output the encrypted data in response to determining, based at least in part on the comparison, that the wearer is the authorized user; and
    an access control device coupled to the wearable device comprising:
        a second short-range transceiver configured to output the payload data to the wearable device, wherein the second short-range transceiver is configured to receive the encrypted data from the first short-range transceiver;
        a second memory configured to store a hardware public key associated with the wearable device; and
        a second processor coupled to the second short-range transceiver and the second memory, wherein the second processor is configured to decrypt the encrypted data to form recovered data in response to the hardware public key, wherein the second processor is configured to determine whether the recovered data is authentic in response to the payload data, and wherein the second processor is configured to direct performance of a tangible action in response to the second processor determining that recovered data is authentic.

2. The access control system of claim 1, further comprising:
    a peripheral device coupled to the access control device, wherein the peripheral device is selected from a group consisting of: an electronic latch, an electronic gate, an electronic door, an electronic control panel, a vending machine, and a vehicle; and wherein the second processor is configured to direct the peripheral device to perform the tangible action.

3. The access control system of claim 1, wherein the tangible action is performed by a peripheral device, wherein the tangible action and the peripheral device are selected from a group consisting of: activating an electronic latch, opening a gate, opening a door, activating a control panel, enabling a vending device, and activating a vehicle.

4. The access control system of claim 1, wherein the tangible action is performed by the access control device, wherein the tangible action is selected from a group consisting of: running a specific program on the access control device, logging the wearer into the access control device, enabling specific options for a program running on the access control device, enabling network access on the access control device, enabling access to software services, and enabling a financial transaction to be entered by the access control device.

5. The access control system of claim 1, wherein the biometric capture portion is also configured to capture authorized user biometric data associated with an authorized user, and wherein the processor of the wearable device is also configured to determine the authentic biometric data in response to the authorized user biometric data.

6. The access control system of claim 5, wherein the processor of the wearable device is configured to: determine the biometric-based private key and a biometric-based public key in response to the authentic biometric data, and wherein the first short-range transceiver is configured to output the biometric-based public key to a remote authentication service.

7. The access control system of claim 1, wherein the wearable device is associated with a seed, wherein the processor is also configured to:
determine the hardware private key and the hardware public key in response to the seed, wherein the first short-range transceiver is configured to output the hardware public key to a remote authentication service.

8. The access control system of claim 1, wherein a seed is selected from a group consisting of: a hardware characteristic of the wearable device, a serial number of the wearable device, and data provided from a remote authentication service.

9. The access control system of claim 1, wherein the payload data comprises an identifier associated with the access control device and a nonce.

10. A method for a control system, comprising:
receiving, by a biometric capture portion of a wearable device configured to be worn by a wearer, wearer biometric data associated with the wearer;
storing, in a memory of the wearable device, the wearer biometric data, authentic biometric data that has been authenticated as being associated with an authorized user, and a hardware private key associated with the wearable device;
receiving, by a first short-range transceiver of the wearable device, payload data;
determining, by a first processor of the wearable device, that the wearer is the authorized user based at least in part on comparing the wearer biometric data to the authentic biometric data associated with the authorized user;
encrypting, by the first processor in response to determining that the wearer is the authorized user, the payload data to form encrypted data using the hardware private key and a biometric-based private key that is generated based on the wearer biometric data of the authorized user; and
outputting, by the first short-range transceiver, the encrypted data in response to determining, based at least in part on the comparison, that the wearer is the authorized user.

11. The method of claim 10, further comprising:
determining, by a second processor, whether the wearable device is authorized to receive services in response to the encrypted data; and
directing, by the second processor, performance of the services in response to determining that the wearable device is authorized to receive the services.

12. The method of claim 11, wherein the services comprise a tangible action performed by a peripheral device selected from a group consisting of: activating an electronic latch, opening a gate, opening a door, activating a control panel, enabling a vending device, and activating a vehicle.

13. The method of claim 11 wherein the services comprise a tangible action performed by an access control device selected from a group consisting of: running a specific program on the access control device, logging the wearer into the access control device, enabling specific options for a program running on the access control device, enabling network access on the access control device, enabling access to software services, and enabling a financial transaction to be entered by the access control device.

14. The method of claim 11, further comprising:
storing, in a second memory of an access control device, a plurality of public keys including a public key associated with the hardware private key;
receiving, by a second processor of the access control device, the encrypted data; and
determining, by the second processor, recovered payload data in response to the encrypted data and the public key, wherein determining whether the wearable device is authorized comprises determining, with the second processor, whether the wearable device is authorized to receive services in response to the recovered payload data and the payload data.

15. The method of claim 14, further comprising:
receiving, by a second short-range transceiver of the access control device, a first ephemeral ID associated with the wearable device; and
selecting, by the second processor, the public key from the plurality of public keys in response to the first ephemeral ID.

16. The method of claim 15, further comprising:
transmitting, by a wide-area network transceiver of the access control device, the first ephemeral ID to a cloud-based authentication server; and
receiving, by the wide-area network transceiver of the access control device, an identifier, wherein selecting the public key comprises selecting the public key from the plurality of public keys in response to the identifier.

17. The method of claim 11, wherein determining whether the wearable device is authorized to receive services comprises:
receiving, by a second short-range transceiver of an access control device, a first ephemeral ID associated with the wearable device and the encrypted data from the wearable device;
transmitting, by a wide-area network transceiver of the access control device, the first ephemeral ID to a cloud-based authentication server;
receiving, by the wide-area network transceiver of the access control device, a public key;
determining, by the second processor, recovered payload data in response to the encrypted data and the public key; and
determining, by the second processor, whether the wearable device is authorized to receive services in response to the recovered payload data and payload data.

18. The method of claim 10, further comprising:
providing, by the wearable device, an identifier associated with the wearable device to an access control device;
authenticating, by a second processor, whether the wearable device is authorized in response to the identifier;
determining, by the second processor, whether the wearable device is authorized to receive services in response to the encrypted data; and
directing, by the second processor, performance of the services in response to determining that the wearable device is authorized to receive the services and to determining that the wearable device is authorized.

19. The method of claim 18, wherein the first short-range transceiver is selected from a group consisting of Bluetooth, BLE, UWB, ZigBee, and Wi-Fi, and wherein the identifier is output from the wearable device using a device selected from a group consisting of: NFC, QR code, optical code, and bar code.

* * * * *